United States Patent
Kadakia et al.

(10) Patent No.: US 11,683,419 B2
(45) Date of Patent: *Jun. 20, 2023

(54) UNIFIED SUPPORT FRAMEWORK FOR A CONTACT CENTER

(71) Applicant: UiPath, Inc., New York, NY (US)

(72) Inventors: Palak Kadakia, Redmond, WA (US); Ankit Saraf, Bellevue, WA (US)

(73) Assignee: UiPath, Inc., New York, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/327,633

(22) Filed: May 21, 2021

(65) Prior Publication Data
US 2021/0281684 A1    Sep. 9, 2021

Related U.S. Application Data

(63) Continuation of application No. 16/704,693, filed on Dec. 5, 2019, now Pat. No. 11,064,073.

(51) Int. Cl.
*H04M 3/51*    (2006.01)
*G06Q 30/02*   (2023.01)
*H04M 3/523*   (2006.01)

(52) U.S. Cl.
CPC ...... *H04M 3/5191* (2013.01); *G06Q 30/0281* (2013.01); *H04M 3/5133* (2013.01); *H04M 3/5175* (2013.01); *H04M 3/5237* (2013.01)

(58) Field of Classification Search
None
See application file for complete search history.

(56) References Cited

U.S. PATENT DOCUMENTS

| | | |
|---|---|---|
| 8,583,466 B2 | 11/2013 | Margulies et al. |
| 9,214,001 B2 | 12/2015 | Rawle |
| 9,692,896 B2 | 6/2017 | Jaffer et al. |

(Continued)

FOREIGN PATENT DOCUMENTS

| | | |
|---|---|---|
| CN | 103049455 A | 4/2013 |
| CN | 103793515 A | 5/2014 |

(Continued)

OTHER PUBLICATIONS

Notification of Reasons for Refusal dated Nov. 26, 2021, in connection with Japanese Patent Application No. 2020-557928, filed Sep. 17, 2020, 6 pgs (including translation)>.

(Continued)

*Primary Examiner* — Quynh H Nguyen
(74) *Attorney, Agent, or Firm* — Chiesa Shahinian & Giantomasi PC (57) ABSTRACT

A system and method provide an integrated automation solution that links multiple systems and applications of a contact center operation and provides a unified support interface and unified knowledge base that delivers relevant data in real-time to assist contact center personnel during a customer interaction. Robotic Process Automation (RPA) is used for automating workflows and processes with robots (e.g., attended and/or unattended) that perform various tasks and activities for capturing information (data, documents, etc.) from multiple front-end and/or back-end systems and applications to provide the necessary data and information in real-time during a contact center session.

20 Claims, 7 Drawing Sheets

(56) References Cited

U.S. PATENT DOCUMENTS

| | | | |
|---|---|---|---|
| 10,021,245 | B1 | 7/2018 | Koster et al. |
| 11,373,131 | B1* | 6/2022 | Venugopal ....... G06Q 10/06395 |
| 2007/0038499 | A1 | 2/2007 | Margulies et al. |
| 2008/0270296 | A1 | 10/2008 | Zhou et al. |
| 2016/0219019 | A1 | 7/2016 | Mathur et al. |
| 2016/0321041 | A1 | 11/2016 | Cavalcante |
| 2018/0054523 | A1 | 2/2018 | Zhang et al. |
| 2018/0370033 | A1* | 12/2018 | Geffen .................. B25J 9/1674 |
| 2019/0050206 | A1 | 2/2019 | Cavalcante |
| 2020/0004798 | A1 | 1/2020 | Weinert, Jr. et al. |

FOREIGN PATENT DOCUMENTS

| | | |
|---|---|---|
| CN | 109474761 A | 3/2019 |
| JP | 2011-210284 A | 10/2011 |
| JP | 2015-162680 A | 9/2015 |

OTHER PUBLICATIONS

"RPA / Business Support Automation Solution," Call Center Japan, vol. 21 No. 9, Rick Telecom Co., Ltd., Aug. 20, 2018, pp. 67-70.

Kojima, Overview and benefits of RPA, "Introducing the outline and benefits of RPA and typical tools," Nov. 9, 2018, Capa CAPA, Inc., 9 pgs.

Extended European Search Report dated Mar. 28, 2022, in connection with European Patent Application No. 20796467.7, filed Sep. 17, 2020, 8 pgs.

Hofmann et al., "Robotic Process Automation," 2019, Electron Markets No. 30, pp. 99-106. XP037095560.

Jacada Workspace Agent Desktop™, Jacada Inc., retrieved online on Oct. 11, 2019, at https://www.jacada.com/products/callcenterdesktop, 18 pgs.

"AssistEdge Engage," retrieved online on Oct. 11, 2019 at https://www.edgeverve.com/assistedge/assistedge-engage/, 5 pgs.

"RPA in Call Centers—Business Cases and Benefits," Maruti TechLabs Pvt Ltd, retrieved online on Oct. 11, 2019, at https://marutitech.com/rpa-call-centers/, 17 pgs.

"Jacada Workspace Agent Desktop™," retrieved online on Oct. 11, 2019, at https://www.jacada.com/products/agent-desktop, 4 pgs.

"Autonomous CX Desktop Unification," retrieved online on Oct. 11, 2019, at https://www.jacada.com/solutions/desktop-unification, 8 pgs.

"Reimagining customer experience with power of AI and Automation," retrieved online on Oct. 11, 2019 at https://www.edgeverve.com/wp-content/uploads/2019/06/AssistEdge-Engage-Brochure_v3.pdf, 2 pgs.

"Demystifying Assisted Automation," retrieved online on Oct. 11, 2019, at https://www.edgeverve.com/wp-content/uploads/2019/05/Demystifying-Assisted-Automation-2019.pdf, 4 pgs.

International Search Report and Written Opinion dated Jan. 4, 2021, in connection with International Patent Application No. PCT/US2020/051145, filed Sep. 17, 2020, 10 pgs.

Chinese Office Action dated May 31, 2022 in connection with Chinese Patent Application No. 202080002582.0, filed Oct. 30, 2020, 8 pgs (including translation).

\* cited by examiner

UNIFIED SUPPORT FRAMEWORK FOR A CONTACT CENTER

This application is a continuation of U.S. patent application Ser. No. 16/704,693, filed Dec. 5, 2019, the disclosure of which is incorporated herein by reference in its entirety.

TECHNICAL FIELD

The present invention relates generally to contact center operations, and more particularly to an integrated automation solution using robotic process automation (RPA) for linking multiple systems and applications of a contact center to provide a unified support interface and knowledge base to assist contact center personnel in managing customer interactions.

BACKGROUND

Many companies and enterprises use call centers or contact centers as a primary means for managing interactions with customers, including various aspects of customer service, technical support, sales and marketing activities, and the like. Robust contact center operations have become ubiquitous and, in many cases, are integrated within a company's customer relationship management (CRM) infrastructure and systems.

An important factor that contributes to overall customer satisfaction is the ease with which a customer is able to interact with a company using the various communication channels that are made available through contact centers for assisting customers with issues, questions or other aspects of customer service. To that end, customers have high expectations regarding the simplicity and speed (e.g., minimal wait time) of contact center interactions and the knowledge and skill of those personnel who staff the contact centers.

Figure 1:
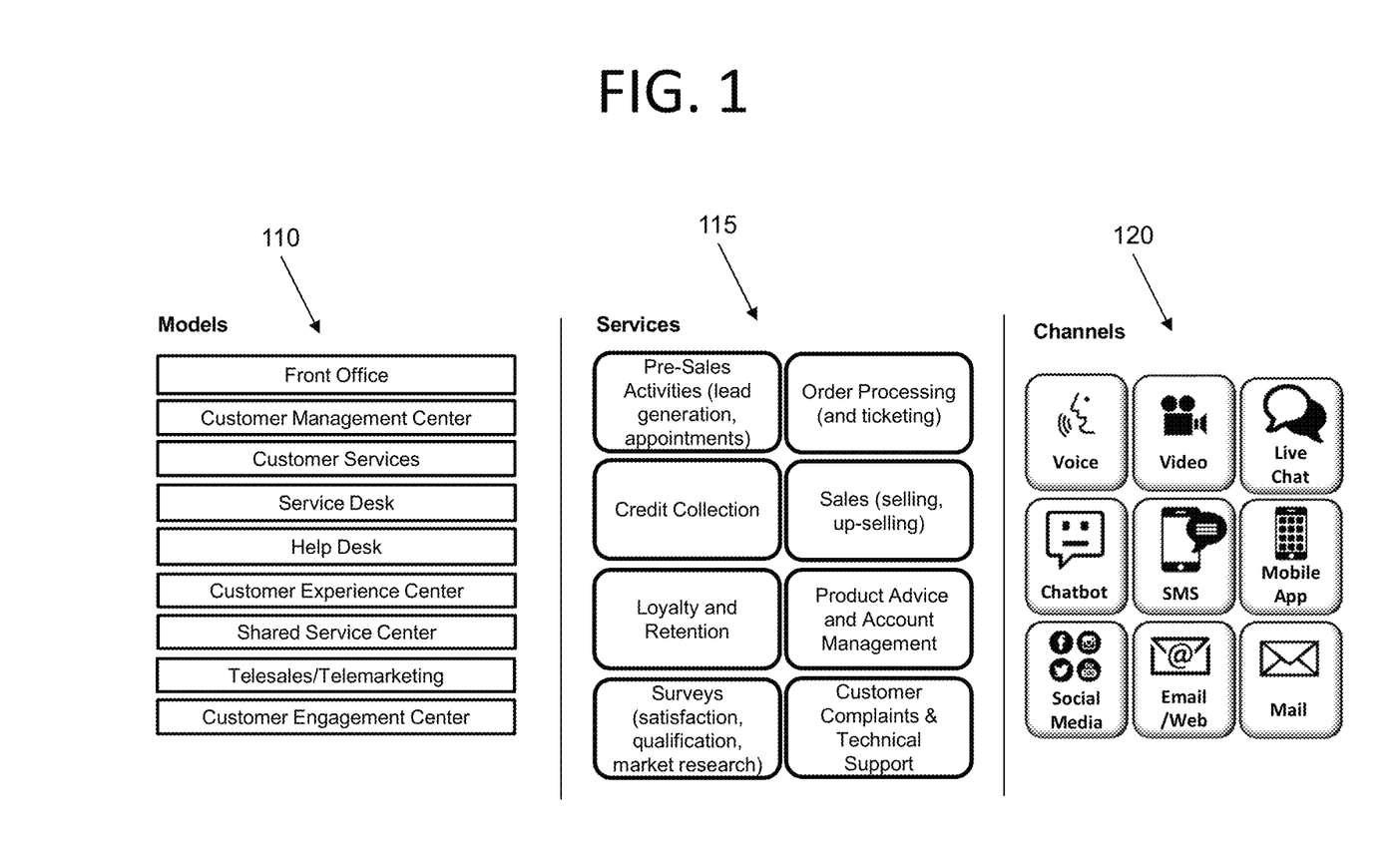
FIG. 1 is a diagram illustrating an exemplary contact center ecosystem.

Because of the focus on the customer experience, the customer service technology ecosystem has grown increasingly more complex over time. FIG. 1 depicts the complexity of today's contact center operations, which can take the form of various models 110, providing numerous different services 115, and offering a multitude of communication channels 120. Providing high quality, efficient and timely service in a contact center is especially challenging because contact center agents typically must be knowledgeable and adept at managing non-consolidated customer service toolkits without effective cross-channel services in their daily activities. The complexity and number of non-integrated, scattered systems and applications holding a customer's transactional data and history, coupled with the need to manage multiple communication channels, make it very difficult to maintain a consistent process and deliver a high quality experience for customers.

For example, contact centers typically require the use of, and navigation across, multiple systems, applications and/or platforms. Rarely are such contact center solutions provided by a single vendor, but rather are typically sourced by multiple vendors. As such, contact center personnel, e.g., a contact center agent (CCA), must often toggle between multiple screens and interfaces when dealing with customer service issues. Using a simplified example of a customer call reaching a service agent, the first step usually involves asking the customer for initial information so that associated transaction or order information can be retrieved from the systems. This first step often presents a service challenge to the service agent. While speaking with the customer, the agent must jump from one system (to retrieve basic customer profile information) to another system (for current order status, prior order histories, pending and/or support tickets). As such, these interfaces usually involve managing large amounts of data and user interface elements, which involves a significant amount of time spent on navigating across the disparate systems and applications. In some instances, each interface/operation may involve approximately 20-40 seconds of navigation time and/or information retrieval, which can add significant time for addressing the customer's needs. Furthermore, jumping between disparate channels shifts the focus away from the customer, lowers agent productivity, and potentially endangers data accuracy and regulatory compliance. Not only do these complications result in a lower number of first-call resolutions, they also lead to a decrease in customer satisfaction due to longer handling times, inconsistent communication, and variable experience across channels.

Automation of contact center tasks and processes is becoming more common. However, conventional automation approaches are typically focused in a singular manner to automate processes and tasks within each of the separate and independent systems and applications, e.g., siloed automation. Although automation has reduced some burden on the contact center agents in performing some tedious tasks (e.g., retrieving data and information), the contact center agent is still burdened with navigating across the disparate systems and applications to synthesize and apply what has been retrieved from the separate automated processes for handling a contact center session with a customer. Furthermore, current approaches do not provide a mechanism for the contact center agent to easily launch and manage the processes that are being automated and their associated outputs across the different systems.

SUMMARY

These and other issues are addressed, in accordance with the various embodiments, with an integrated automation solution that links multiple systems and applications of a contact center operation and provides a unified support interface and unified knowledge base that delivers relevant data in real-time to assist contact center personnel during a customer interaction. According to the various embodiments, robotic process automation (RPA) is used for automating workflows and processes with robots (e.g., attended and/or unattended) that perform various tasks and activities for capturing information (data, documents, etc.) from multiple front-end and/or back-end systems and applications to provide the necessary data and information in real-time during a contact center session.

In an embodiment, a computer-implemented method for providing assistance to a user managing a communication session in a contact center system, wherein the contact center system includes at least one or more applications, comprises: triggering, by a computing system during the communication session, one or more robotic process automation (RPA) workflows; executing the one or more RPA workflows to search the at least one or more applications for information relevant to the communication session; and consolidating and presenting in substantially real-time, by the one or more RPA workflows, the relevant information in a unified support interface for use during the communication session.

Other embodiments include a system and a computer program embodied on a non-transitory computer-readable medium, for providing assistance to a user in a contact center managing a communication session in accordance with the computer-implemented method described above.

In some embodiments, one or more candidate RPA workflows may be presented in the unified support interface for selection by the user to invoke an automation process. According to some embodiments, one or more RPA workflows may be triggered by the user and the RPA workflows are executed by one or more attended robots. In other embodiments, one or more RPA workflows may be triggered by the computing system and the one or more RPA workflows are executed by one or more unattended robots. According to various embodiments, RPA workflows are used to search one or more applications by performing contact-based searching to identify and retrieve the relevant information based on customer-specific parameters and/or by performing knowledge-based searching to identify and retrieve the relevant information based on issue-specific parameters associated with the communication session. In some examples, customer-specific parameters may include customer profile information, customer account information, and/or past customer-specific history of contact center communication sessions from a plurality of communication channels. In other embodiments, issue-specific parameters may include keywords associated with products and/or services relating to the communication session and/or past customer-specific history of contact center communication sessions from a plurality of communication channels. In the example of knowledge-based searching, relevant information that is consolidated and presented may include product-related and/or issue-related documentation from a knowledge repository. In some embodiments, a source link may be provided to the user via the unified support interface for directly accessing the presented documentation.

According to the embodiments described and claimed herein, contact center agents can select automation choices for triggering attended robots to execute routine tasks to retrieve information that resides in multiple disparate systems (front-end and/or back-end) so that contact center agents do not have to navigate between various applications and systems during a contact center session with a customer. Contact center agents are provided with a single touch point utilizing the unified support interface enabled by RPA, which reduces latency and complexity in managing contact center interactions across all communication channels, thereby improving customer satisfaction, employee efficiency and operational profitability.

DETAILED DESCRIPTION

Various illustrative embodiments will now be described more fully with reference to the accompanying drawings in which some of the illustrative embodiments are shown. It should be understood, however, that there is no intent to limit illustrative embodiments to the particular forms disclosed, but on the contrary, illustrative embodiments are intended to cover all modifications, equivalents, and alternatives falling within the scope of the claims. Where appropriate, like numbers refer to like elements throughout the description of the figures. It will be understood that, although terms such as first, second, etc. may be used herein to describe various elements, these elements should not be limited by these terms. These terms are only used to distinguish one element from another. For example, a first element could be termed a second element, and, similarly, a second element could be termed a first element, without departing from the scope of illustrative embodiments. As used herein, the term "and/or" includes any and all combinations of one or more of the associated listed items.

As used in the context of the various embodiments described and claimed herein, the term "contact center" is used in a generic and non-limiting manner and therefore is intended to include any form of a customer service operation (e.g., contact center, call center, technical support, customer experience, hotline, customer care, and the like). For ease of description, all such operations will be referred hereinafter using the term "contact center". Furthermore, in the embodiments described and claimed herein, the term 'contact center system" is used in a generic and non-limiting manner and therefore is intended to include any implementation of a contact center product, service, operation, function and so on. For example, a contact center system can encompass implementations that may include various combinations of computer systems/devices, computer/software applications, computer/software platforms, and so on. For ease of description, the term "application" or "applications" will also be used as a generic term to refer to any singular use or combination use of computer systems/devices, computer/software applications, and/or computer/software platforms, any or all of which may be used by contact center agents in performing tasks in or for contact centers. Furthermore, the use of contact center or contact center system is not intended to be limited in any geographical or location-based context. For example, contact centers and contact center systems may have a centralized or distributed architecture, and staffing by contact center agents may also take various forms (local, remote, etc.).

According to the various embodiments described herein, robotic process automation (RPA) is used for automating workflows and processes for contact center operations. In general, RPA is a form of process automation using software robots to automate repetitive and/or labor-intensive tasks to improve productivity of human operators. In an RPA-enabled system, workflows comprising one or more activities are created and then executed by robots, either in an attended mode (e.g., triggered by human agents to assist in completing processes) or in unattended mode (e.g., working independently, such as with back-end system tasks).

Figure 2:
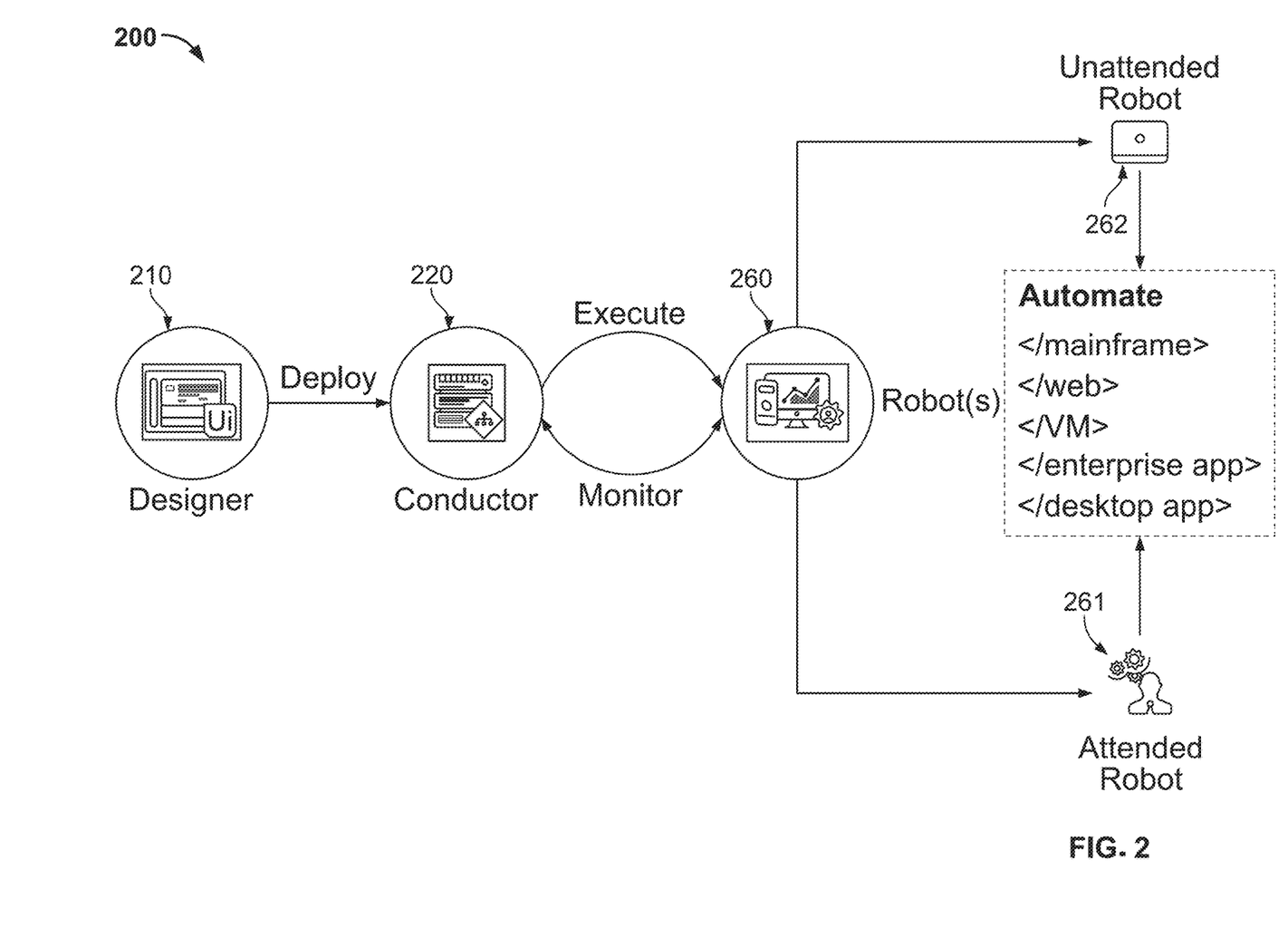
FIG. 2 is an architectural diagram illustrating an RPA system according to an embodiment of the invention.

Exemplary RPA System Architecture. FIG. 2 is an architectural diagram of an RPA system 200 according to an illustrative embodiment. As shown, RPA system 200 includes designer 210 to allow a developer to design automation processes using workflows. More specifically, designer 210 facilitates the development and deployment of workflows and robots for performing activities in the workflows. Designer 210 may provide a solution for application integration, as well as automating third-party applications, administrative Information Technology (IT) tasks, and business processes for contact center operations. One commercial example of an embodiment of designer 210 is UiPath Studio™.

In designing the automation of rule-based processes, the developer controls the execution order and the relationship between a custom set of steps developed in a workflow, defined herein as "activities." Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 260 that execute the workflows developed in designer 210. One commercial example of an embodiment of conductor 220 is UiPath Orchestrator™. Conductor 220 facilitates management of the creation, monitoring, and deployment of resources in an RPA environment. In one example, conductor 220 is a web application. Conductor 220 may also function as an integration point with third-party solutions and applications.

Conductor 220 may manage a fleet of robots 260 by connecting and executing robots 260 from a centralized point. Conductor 220 may have various capabilities including, but not limited to, provisioning, deployment, configuration, queueing, monitoring, logging, and/or providing interconnectivity. Provisioning may include creating and maintenance of connections between robots 260 and conductor 220 (e.g., a web application). Deployment may include assuring the correct delivery of package versions to assigned robots 260 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 260 are execution agents that run workflows built in designer 210. One commercial example of some embodiments of robots 260 is UiPath Robots™. Types of robots 260 may include, but are not limited to, attended robots 261 and unattended robots 262. Attended robots 261 are triggered by a user or user events and operate alongside a human user, e.g., a contact center agent, on the same computing system. Attended robots 261 may help the human user accomplish various tasks, and may be triggered directly by the human user and/or by user events. In the case of attended robots, conductor 220 may provide centralized process deployment and a logging medium. In certain embodiments, attended robots 261 can only be started from a "robot tray" or from a command prompt in a web application. Unattended robots 262 operate in an unattended mode in virtual environments and can be used for automating many processes, e.g., for high-volume, back-end processes and so on. Unattended robots 262 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 260 install the Microsoft Windows® Service Control Manager (SCM)-managed service or other management/deployment services by default. As a result, such robots 260 can open interactive Windows® sessions under the local system account, and have the rights of a Windows® service. In some embodiments, robots 260 can be installed in a user mode with the same rights as the user under which a given robot 260 has been installed.

Robots 260 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 260 are executed). These services are trusted with and manage the credentials for robots 260. A console application is launched by the SCM under the local system. User mode robot services in some embodiments manage and monitor Windows® sessions and act as a proxy between conductor 220 and the execution hosts. User mode robot services may be trusted with and manage the credentials for robots 260. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 3:
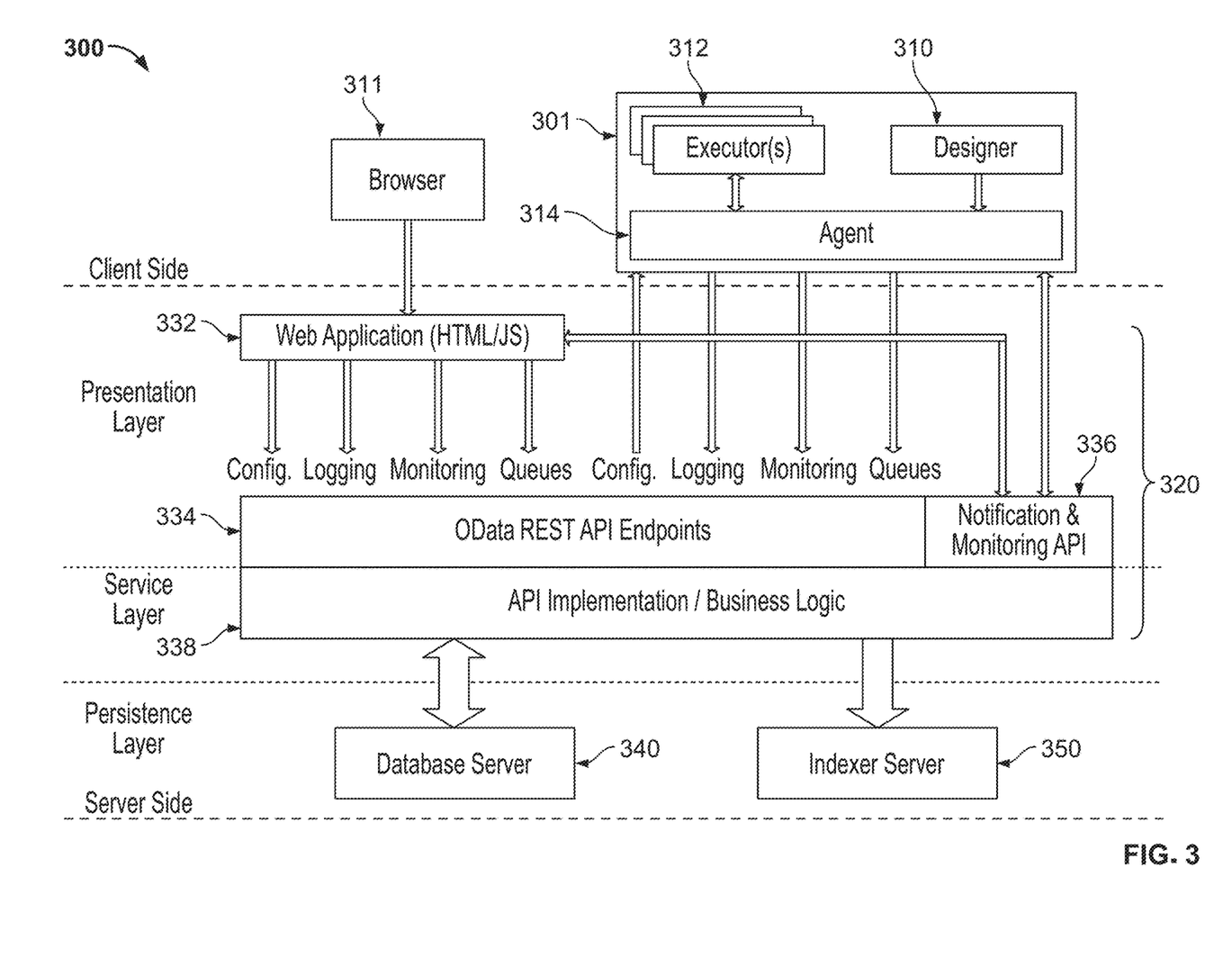
FIG. 3 is an architectural diagram illustrating an example of a deployed RPA system according to an embodiment of the invention.

FIG. 3 shows RPA system 300 according to an illustrative embodiment. RPA system 300 may be, or may be part of, RPA system 200 of FIG. 2. It should be noted that the "client side", the "server side", or both, may include any desired number of computing systems without deviating from the scope of the invention.

As shown on the client side in this embodiment, computing system 301 includes one or more executors 312, agent 314, and designer 310. In other embodiments, designer 310 may not be running on the same computing system 301. An executor 312 (which may be a robot component as described above) runs a process and, in some embodiments, multiple business processes may run simultaneously. In this example, agent 314 (e.g., a Windows® service) is the single point of contact for managing executors 312.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 314 is also responsible for sending the status of the robot (e.g., periodically sending a "heartbeat" message indicating that the robot is still functioning) and downloading the required version of the package to be executed. The communication between agent 314 and conductor 320 is initiated by agent 314 in some embodiments. In the example of a notification scenario, agent 314 may open a WebSocket channel that is later used by conductor 320 to send commands to the robot (e.g., start, stop, etc.).

As shown on the server side in this embodiment, a presentation layer comprises web application 332, Open Data Protocol (OData) Representative State Transfer (REST) Application Programming Interface (API) endpoints 334 and notification and monitoring API 336. A service layer on the server side includes API implementation/business logic 338. A persistence layer on the server side includes database server 340 and indexer server 350. Conductor 320 includes web application 332, OData REST API endpoints 334, notification and monitoring API 336, and API implementation/business logic 338.

In various embodiments, most actions that a user performs in the interface of conductor 320 (e.g., via browser 311) are performed by calling various APIs. Such actions may include, but are not limited to, starting jobs on robots, adding/removing data in queues, scheduling jobs to run unattended, and so on. Web application 332 is the visual layer of the server platform. In this embodiment, web application 332 uses Hypertext Markup Language (HTML) and JavaScript (JS). However, any desired markup languages, script languages, or any other formats may be used without deviating from the scope of the invention. The user interacts with web pages from web application 332 via browser 311 in this embodiment in order to perform various actions to control conductor 320. For instance, the user may create robot groups, assign packages to the robots, analyze logs per robot and/or per process, start and stop robots, etc.

In addition to web application 332, conductor 320 also includes a service layer that exposes OData REST API endpoints 334 (or other endpoints may be implemented without deviating from the scope of the invention). The REST API is consumed by both web application 332 and agent 314. Agent 314 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 320. Queueing REST endpoints may be responsible for queues and queue item management, such as adding data to a queue, obtaining a transaction from the queue, setting the status of a transaction, etc. Monitoring REST endpoints monitor web application 332 and agent 314. Notification and monitoring API 336 may be REST endpoints that are used for registering agent 314, delivering configuration settings to agent 314, and for sending/receiving notifications from the server and agent 314. Notification and monitoring API 336 may also use WebSocket communication in some embodiments.

The persistence layer on the server side includes a pair of servers in this illustrative embodiment—database server 340 (e.g., a SQL server) and indexer server 350. Database server 340 in this embodiment stores the configurations of the robots, robot groups, associated processes, users, roles, schedules, etc. This information is managed through web application 332 in some embodiments. Database server 340 may also manage queues and queue items. In some embodiments, database server 340 may store messages logged by the robots (in addition to or in lieu of indexer server 350). Indexer server 350, which is optional in some embodiments, stores and indexes the information logged by the robots. In certain embodiments, indexer server 350 may be disabled through configuration settings. In some embodiments, indexer server 350 uses ElasticSearch®, which is an open source project full-text search engine. Messages logged by robots (e.g., using activities like log message or write line) may be sent through the logging REST endpoint(s) to indexer server 350, where they are indexed for future utilization.

Figure 4:
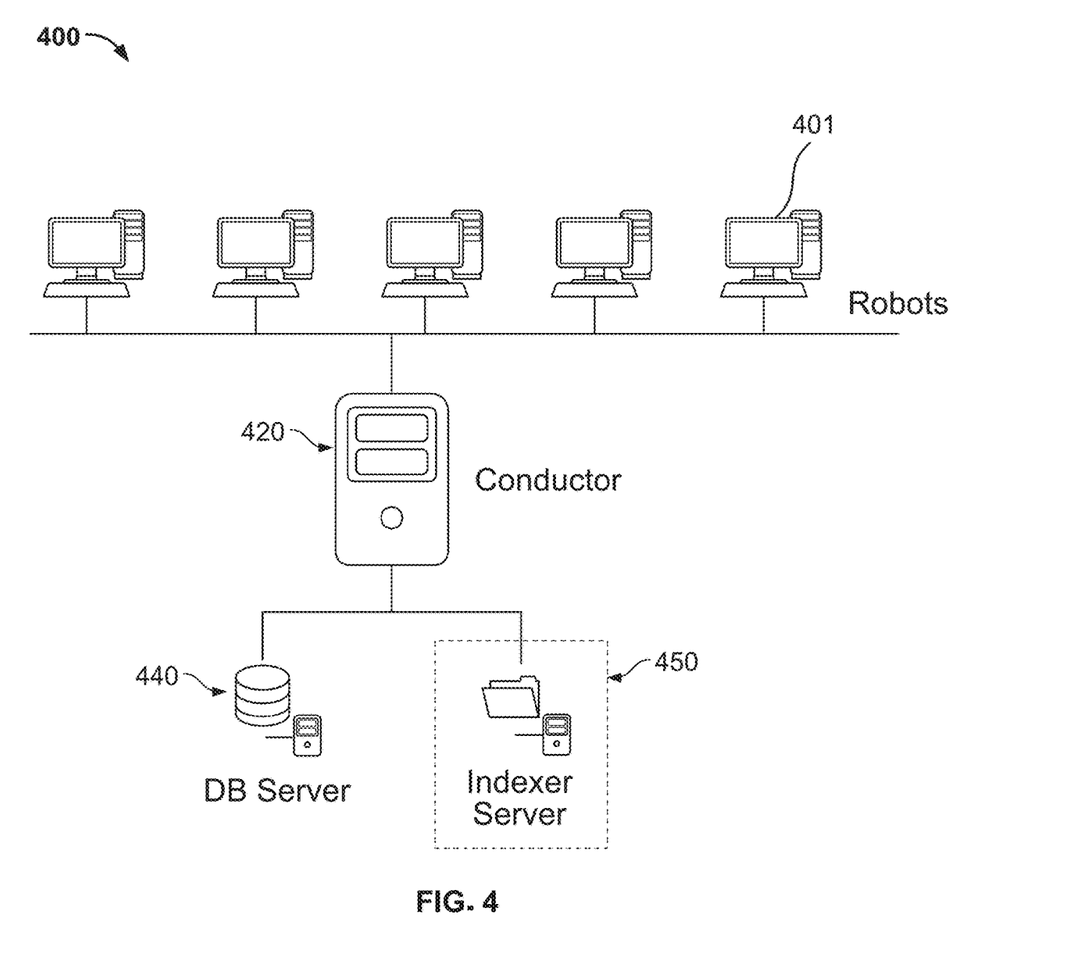
FIG. 4 is an architectural diagram illustrating a simplified deployment example of an RPA system according to an embodiment of the invention.

FIG. 4 is an architectural diagram illustrating a simplified deployment example of RPA system 400 according to an embodiment of the present invention. In some embodiments, RPA system 400 may be, or may include RPA systems 200 and/or 300 of FIGS. 2 and 3. RPA system 400 includes multiple client computing systems 401 running robots. Computing systems 401 are able to communicate with a conductor computing system 420 via a web application running thereon. Conductor computing system 420, in turn, communicates with database server 440 and an optional indexer server 450. With respect to FIGS. 3 and 4, it should be noted that while a web application is used in these embodiments, any suitable client/server software may be used without deviating from the scope of the invention. For instance, the conductor may run a server-side application that communicates with non-web-based client software applications on the client computing systems.

RPA-Enabled Contact Center Solution. According to various embodiments disclosed herein, an integrated RPA-based automation solution is provided that links multiple systems and applications of a contact center operation and provides a unified support interface and unified knowledge base that delivers relevant data in real-time to assist contact center personnel (e.g., a contact center agent) during a customer interaction. Workflows are automated and executed by robots to capture information (data, documents, etc.) from multiple front-end and/or back-end systems (including systems of record and systems of engagement) and applications to build a unified knowledge base that is accessible via a unified support interface (e.g., unified console) to the contact center agent. In many contact center operations, the front-end systems generally include customer relationship management (CRM) and/or enterprise resource planning (ERP) applications used by contact center agents for querying information about the calling customer. Additionally, the front-end may include interactive voice response (IVR)

systems that handle incoming calls, knowledge bases to look up and retrieve troubleshooting steps for a given issue, ticket management systems to track customer issues, and so on. The back-end systems and applications in a contact center may include a provisioning system for shipping or configuring products/services for the customer (e.g., for the cable company configuring a modem), billing systems, credit card processing and collection systems, purchasing systems, order tracking, and so on. Some examples of such systems/applications may include, but are not limited to SAP®, Siebel®, mainframe systems, Citrix® virtualized legacy systems, Salesforce®, Microsoft® Excel, ServiceNow®, Twilio®, and various other systems and applications. These examples are meant to be illustrative only and not limiting in any manner.

Figure 5:
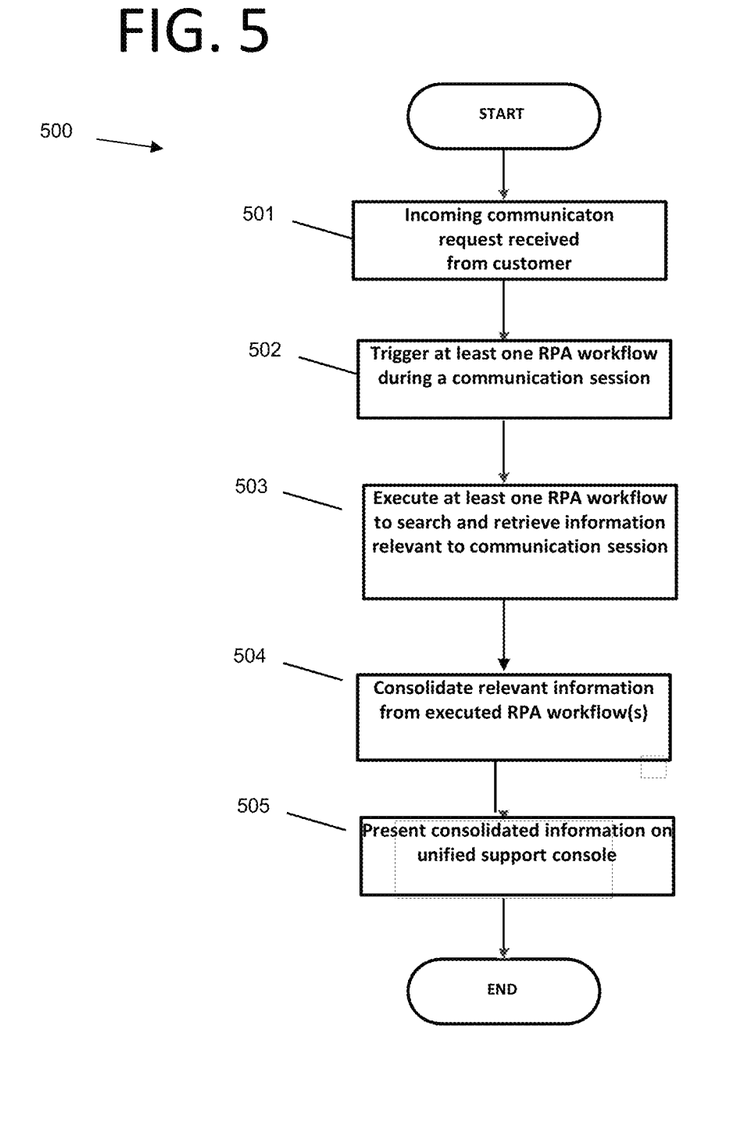
FIG. 5 is a flowchart showing a method according to an embodiment of the invention.

FIG. 5 is a flowchart illustrating a process 500 for providing a unified support interface for contact center operations according to an embodiment of the invention. Referring back to FIG. 3, process 500 may be performed on the client side in an RPA architecture (e.g., by computing system 301 for example). More specifically, process 500 is a method for providing assistance to a contact center agent (e.g., a user) who is managing a communication session with a customer or fulfilling a customer request. In one embodiment, the contact center system used by the contact center agent to handle customer calls (or communications through a number of different channels) includes one or more applications and systems (also referred to collectively as "applications") that may also be on different platforms. In many scenarios, such applications and systems are disparate, non-integrated and time-consuming to navigate because the contact center agent must not only toggle between these multiple systems and applications, but he or she must also have working-level proficiency and expertise in each of the systems. Even if the contact center agent possesses such proficiency, navigating across the multiple systems is still time consuming and therefore disruptive to both the contact center agent and the customer while the communication session is in progress.

As shown in FIG. 5, the contact center agent receives an incoming communication request from a customer at step 501. Referring back to FIG. 1, such communication requests can occur over a number of different communication channels 120 that are now prevalent in many customer relationship/contact center systems. For example, communication channels 120 may include voice calls (e.g., directly received or redirected from Interactive Voice Response (IVR) systems), live chats, video sessions, emails, online-initiated inquiries, social media channel messaging, SMS messaging, and so on. As such, the contact center agent already is challenged by the multiplicity of communication channels that he or she must service for inbound customer communications.

Upon receipt and acceptance of an inbound customer call, a communication session is established between the contact center agent and the customer. In a typical scenario, depending on the nature of the inquiry or issue to be resolved, the contact center agent would normally have to search for customer information, account information, product information, customer and/or product history information and so on, by toggling between and navigating the aforementioned multiple systems and platforms. This process takes place all while still engaged in the communication session with the customer. As a result, and depending on the complexity of the inbound request, many contact center sessions can be characterized by long wait times, frequent interruptions as the communication session is repeatedly placed on hold, and sporadic success in resolving the issue depending on the skill of the agent and the relevancy and usefulness of the information that he or she is able to locate during the session. According to an embodiment of the invention, as shown in step 502, at least one RPA workflow can be triggered during the communication session. For example, the contact center agent may be presented with a unified support interface (e.g., a unified console) from which one or more RPA workflows can be triggered.

According to embodiments of the invention, various methods can be used for triggering an RPA workflow to invoke robot(s) to assist the contact center agent with navigating across the complex multi-application, multi-platform contact center systems. In one example, the contact center agent can select an automation choice to trigger an attended robot directly from the unified console, e.g., select from among one or more candidate automation workflows that have been provided on the agent's console. As one example, the contact center agent can trigger an automated "address update" RPA process directly from the unified console. By doing so, the contact center agent can avoid having to toggle between multiple applications and instead can remain in his/her "home" application while "in-call" with a customer. This functionality can be embedded in or can "float" over the contact center application being used by the contact center agent.

Contextual triggers can also be used for robot invocation. For example, event-driven triggers can be used whereby an automated RPA process is launched automatically based on user actions such as a "button click", keyboard actions (e.g., including triggers based on shortcut keys), and so on. In another example, text-based triggers can be implemented, e.g., using chatbot conversations whereby a keyword can be used to trigger an automated process. Voice-based triggers could include launching an automated process based on keyword(s) detected during communication sessions. As demonstrated by the above examples, various methods for triggering automated processes, e.g., attended or unattended robots, from the unified console or from other mechanisms, and so on, are contemplated by teachings herein. As such, the above examples are therefore not intended to be limiting in any manner.

In various embodiments, the unified support interface (unified console) may be designed via a low-code/no-code application development platform that allows non-technical users to design applications for use by contact center agents. The application platform can be a drag-and-drop tool that includes design controls with the ability to invoke RPA tasks to populate or update data. According to embodiments described herein, triggers may be implemented as activities (e.g., in an RPA-enabled workflow) to listen for specific events on the local machine. Both attended and unattended robots can be used for this purpose. In one example for triggering attended robots, a button or some other action can be performed by the user (e.g., contact center agent) that indicates to the application that an attended robot needs to be triggered. Attended automation can be triggered in various ways, including by text changes, keyboard or mouse events, by voice, and various other methods. Alternatively, according to other embodiments, items can be added to work queues (described previously) for unattended robots to pick up and process.

Returning to FIG. 5, in step 503, at least one RPA workflow is executed to search and retrieve information that is relevant to the communication session. More specifically, robots (e.g., attended robots) are launched to navigate the various applications and systems (e.g., front-end and/or back-end systems) to identify relevant information that will assist the contact center agent, in real-time, in servicing the customer's request. According to the embodiments described herein, attended robots can be used for responding in real-time while unattended automation (e.g., via unattended robots) is generally used for adding items, information, etc. for subsequent and/or offline processing. In this manner, front-back office automation can be supported whereby attended robots perform real-time actions and hand off to unattended robots for post-processing (e.g., that does not necessarily need to be done in real-time) or for back-office processing. The embodiments described herein also can support a mode of operation in which activities/tasks can be handed off to other business users in the back-office for further processing. These examples are meant to be illustrative only and not limiting in any manner.

The searching methodologies employed in the RPA processes can take on various forms. In one exemplary embodiment, robot(s) will perform contact-based (e.g., customer-based) searching to identify and retrieve relevant information based on customer-specific parameters. In another example, robot(s) will perform knowledge-based searching to identify and retrieve the relevant information based on issue-specific parameters associated with the communication session. Any combination of these two search approaches can also be employed to identify relevant information to assist the contact center agent.

In contact-based searching, the various databases that are repositories for customer profile and account information will be searched, e.g., searches based on customer name, address, contact, account type, recent billing and payment, recent cases by the customer, order history, current product/service used by customer, etc. In addition, communication history can be searched to identify and retrieve all communications between the customer and the enterprise and from any of the different communication channels (e.g., omni-channel inputs). For example, robots would search for: chatbot message history (e.g., from chatbot partners or platform; chat history with live agents; message history through messaging channels (e.g., SMS, social media, etc.); and IVR/call histories with agents.

In knowledge-based searching, various knowledge management repositories can be searched based on issue-specific parameters associated with the communication session. Such searching can be based on keywords to find relevant product information, past customer history with particular products, and so on. These examples are also meant to be illustrative and not limiting in any manner.

Returning to FIG. 5, the relevant information retrieved from the executed RPA workflows is consolidated (or otherwise aggregated) in step 504 and the consolidation information is presented to the contact center agent on the unified console in step 505. According to embodiments of the invention, robots return all search results to so that the contact center agent is able to view, on the unified console, all customer profile information, all related knowledge articles, FAQ, or product manuals, and so on, that will assist the contact center agent in effectively resolving the open communication session. In some embodiments, links to the source of identified relevant information can also be provided on the unified console, e.g., that could be used to open an application or PDF and/or launch further automation to navigate to the desired section or location for retrieving the information or documentation.

Figure 6:
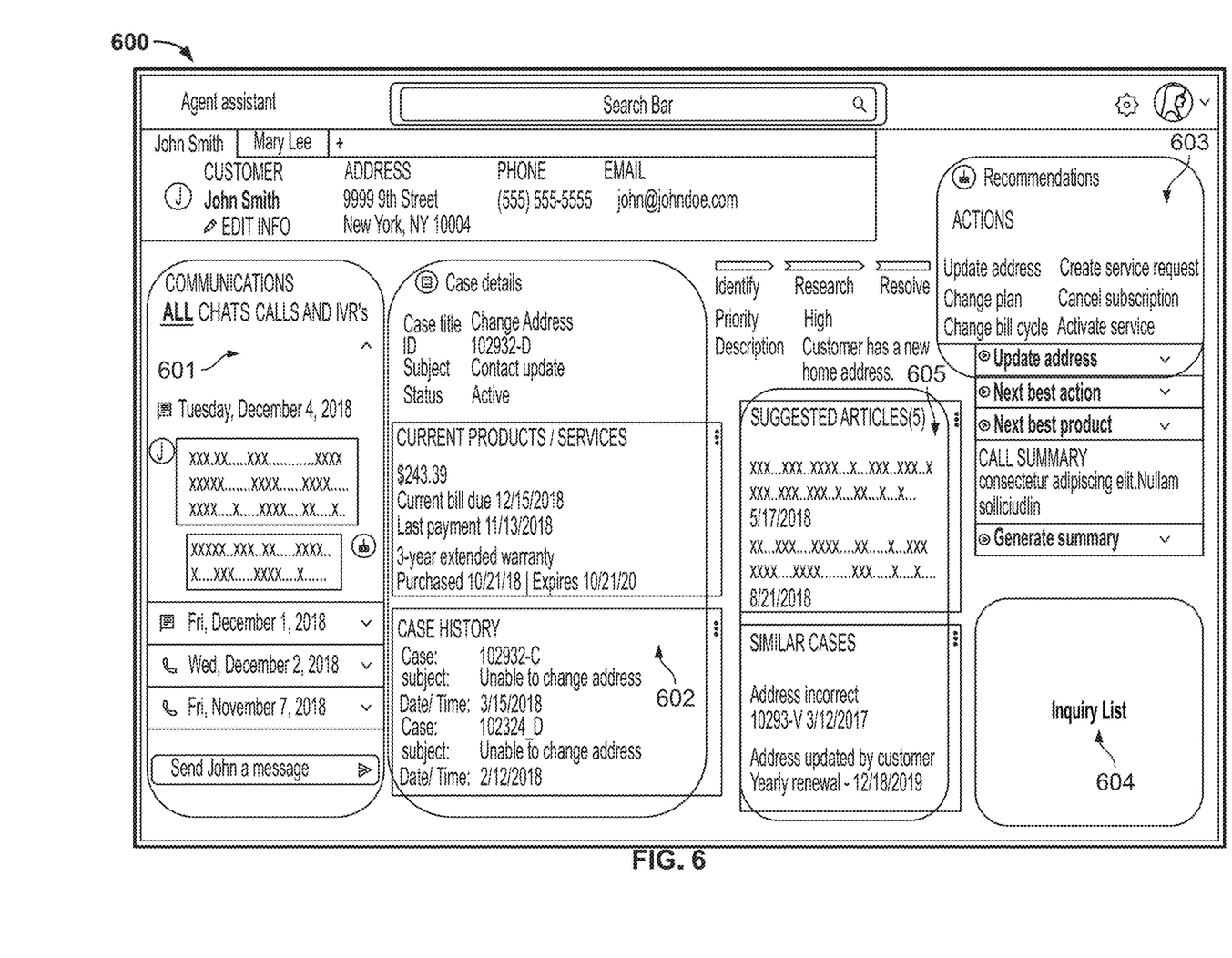
FIG. 6 is a screenshot of the unified support interface according to an embodiment of the invention.

With such consolidation, aggregation and presentation, the unified console interacts seamlessly with front-end and back-end applications/systems to retrieve all relevant customer information and knowledge repository via robots. The consolidated data is returned from the robots and displayed in the unified console before or during the contact center agent's interaction with the customer. In effect, the unified support interface (e.g., unified console) is a central "canvas" for managing interactions between customers, contact center agents, and the multitude of systems that contact center agents interact with in a contact center operation. The unified console is used for both pulling and passing information from and to applications that the contact center agent must be able to work in. According to other embodiments, the unified console can also be customizable, e.g., to include custom automation widgets (for launching attended robots), provide a status dashboard of automations in progress during a communication session, drill-down capability to get additional information on presented information, and so on. FIG. 6 shows an exemplary screenshot 600 of a unified support interface (e.g., unified console) according to an illustrative embodiment.

As shown in FIG. 6, various sections (again customizable) of the display can include the results that were retrieved, consolidated and presented as a result of the RPA workflows executed by the robots as described in detail above. For example, sections 601 and 602 show the communication history and case history based on the retrieved data from the front-end and/or back-end systems. According to another embodiment, an action list, shown in section 603, can be used to display the most common actions for agents which require an agent's input during the process. According to another embodiment, an inquiry list, shown in section 604, can be used to display the most common inquires for agents that do not necessarily require agents input during the process. The action list 603 and inquiry list 604 may be context-aware and recommendations may be based on enterprise business process assessment, customer case history, profile, events, and so on. A contact center agent may be given the capability to mark his/her own "favorite' actions by specific icon and automation may be triggered by clicking on the icon, or an action name, or event.

According to another embodiment, artificial intelligence-enabled (AI-enabled) predictive services may be provided as part of the unified console. For example, similar case information may be provided, as shown in section 605. Based on customer description of the problem, the existing knowledge base, and interaction history, automated processes can be invoked to recommend the list of cases with similar case type and issues. Additionally, suggested articles or references can also be identified, as shown in section 605, e.g., reference materials that may be potentially relevant from other similar cases. AI-enabled services can also include automation to formulate a Next Best Action (e.g., to provide agents with smart, contextual recommendations for next steps with customers) or a Next Best Offer (e.g., to recommend new services or products matching the existing portfolio of the customer, etc.). For this type of functionality, automatic triage may be employed in some embodiments for intelligent classification and intelligent routing capability, for example. With intelligent classification, machine learning may be employed to automatically classify cases as they come into system. This added functionality can aid in resolving customer service cases more quickly. With intelligent routing, high priority cases can get quickly routed to the next available agent before the agent answers the call/chat and/or get routed to the best agent who has the appropriate level of skill and knowledge.

Figure 7:
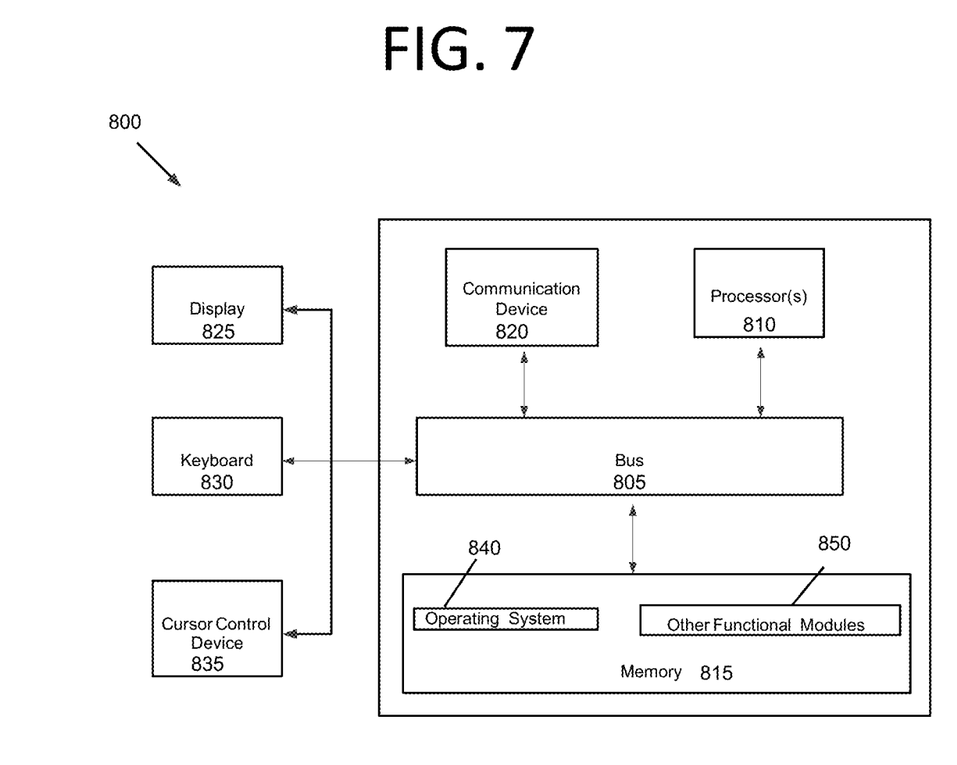
FIG. 7 is a block diagram of a computing system according to an embodiment of the invention.

FIG. 7 is a block diagram illustrating a computing system 800 configured to execute the method described in reference to FIG. 5, according to an embodiment of the present invention. In some embodiments, computing system 800 may be one or more of the computing systems depicted and/or described herein. Computing system 800 includes a bus 805 or other communication mechanism for communicating information, and processor(s) 810 coupled to bus 805 for processing information. Processor(s) 810 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 810 may also have multiple processing cores, and at least some of the cores may be configured to perform specific functions. Multi-parallel processing may be used in some embodiments.

Computing system 800 further includes a memory 815 for storing information and instructions to be executed by processor(s) 810. Memory 815 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 810 and may include volatile media, non-volatile media, or both. The media may also be removable, non-removable, or both.

Additionally, computing system 800 includes a communication device 820, such as a transceiver, to provide access to a communications network via a wireless and/or wired connection according to any currently existing or future-implemented communications standard and/or protocol.

Processor(s) 810 are further coupled via bus 805 to a display 825 that is suitable for displaying information to a user. Display 825 may also be configured as a touch display and/or any suitable haptic I/O device.

A keyboard 830 and a cursor control device 835, such as a computer mouse, a touchpad, etc., are further coupled to bus 805 to enable a user to interface with computing system. However, in certain embodiments, a physical keyboard and mouse may not be present, and the user may interact with the device solely through display 825 and/or a touchpad (not shown). Any type and combination of input devices may be used as a matter of design choice. In certain embodiments, no physical input device and/or display is present. For instance, the user may interact with computing system 800 remotely via another computing system in communication therewith, or computing system 800 may operate autonomously.

Memory 815 stores software modules that provide functionality when executed by processor(s) 810. The modules include an operating system 840 for computing system 800 and one or more additional functional modules 850 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for providing assistance to a user managing a communication session in a contact center system, the contact center system including one or more applications, the computer-implemented method comprising:
   presenting a unified support interface displaying one or more candidate robotic process automation (RPA) workflows;

receiving a user selection of one or more RPA workflows of the one or more candidate RPA workflows via the unified support interface to trigger the one or more RPA workflows for execution;

executing the one or more RPA workflows to search the one or more applications for information relevant to the communication session; and presenting the relevant information in the unified support interface.

2. The computer-implemented method of claim 1, wherein executing the one or more RPA workflows to search the one or more applications for information relevant to the communication session comprises:

executing the one or more RPA workflows by one or more attended robots.

3. The computer-implemented method of claim 1, wherein executing the one or more RPA workflows to search the one or more applications for information relevant to the communication session comprises:

executing the one or more RPA workflows by one or more unattended robots.

4. The computer-implemented method of claim 1, wherein executing the one or more RPA workflows to search the one or more applications for information relevant to the communication session comprises:

performing contact-based searching to search repositories for customer profile, account information, and communication history.

5. The computer-implemented method of claim 1, wherein executing the one or more RPA workflows to search the one or more applications for information relevant to the communication session comprises:

performing knowledge-based searching to search repositories based on issue-specific parameters associated with the communication session.

6. The computer-implemented method of claim 1, wherein presenting the relevant information in the unified support interface comprises:

presenting a link to a source of the relevant information via the unified support interface.

7. The computer-implemented method of claim 1, further comprising:

presenting a status dashboard of automations in progress during the communication session via the unified support interface.

8. The computer-implemented method of claim 1, wherein the one or more candidate RPA workflows comprises common actions for agents of the contact center system.

9. The computer-implemented method of claim 1, wherein the presenting the unified support interface, the receiving, the executing, and the presenting the relevant information are performed by one or more computing devices implemented in a cloud computing system.

10. A system for providing assistance to a user managing a communication session in a contact center system, the contact center system including at least one or more applications, the system comprising:

a memory storing computer program instructions; and
at least one processor configured to execute the computer program instructions, the computer program instructions configured to cause the at least one processor to perform operations of:

presenting a unified support interface displaying one or more candidate robotic process automation (RPA) workflows;

receiving a user selection of one or more RPA workflows of the one or more candidate RPA workflows via the unified support interface to trigger the one or more RPA workflows for execution;

executing the one or more RPA workflows to search the one or more applications for information relevant to the communication session; and presenting the relevant information in the unified support interface.

11. The system of claim 10, wherein executing the one or more RPA workflows to search the one or more applications for information relevant to the communication session comprises:

executing the one or more RPA workflows by one or more attended robots.

12. The system of claim 10, wherein executing the one or more RPA workflows to search the one or more applications for information relevant to the communication session comprises:

executing the one or more RPA workflows by one or more unattended robots.

13. The system of claim 10, wherein executing the one or more RPA workflows to search the one or more applications for information relevant to the communication session comprises:

performing contact-based searching to search repositories for customer profile, account information, and communication history.

14. The system of claim 10, wherein the system is implemented in a cloud computing system.

15. A non-transitory computer readable medium storing computer program instructions for providing assistance to a user managing a communication session in a contact center system, the contact center system including at least one or more applications, the computer program instructions when executed by one or more processors cause the one or more processors to perform operations comprising:

presenting a unified support interface displaying one or more candidate robotic process automation (RPA) workflows;

receiving a user selection of one or more RPA workflows of the one or more candidate RPA workflows via the unified support interface to trigger the one or more RPA workflows for execution;

executing the one or more RPA workflows to search the one or more applications for information relevant to the communication session; and presenting the relevant information in the unified support interface.

16. The non-transitory computer readable medium of claim 15, wherein executing the one or more RPA workflows to search the one or more applications for information relevant to the communication session comprises:

performing knowledge-based searching to search repositories based on issue-specific parameters associated with the communication session.

17. The non-transitory computer readable medium of claim 15, wherein presenting the relevant information in the unified support interface comprises:

presenting a link to a source of the relevant information via the unified support interface.

18. The non-transitory computer readable medium of claim 15, the operations further comprising:

presenting a status dashboard of automations in progress during the communication session via the unified support interface.

19. The non-transitory computer readable medium of claim 15, wherein the one or more candidate RPA workflows comprises common actions for agents of the contact center system.

20. The non-transitory computer readable medium of claim 15, wherein the one or more processors are implemented in one or more computing devices and the one or more computing devices are implemented in a cloud computing system.

* * * * *